United States Patent
Kim et al.

(10) Patent No.: US 9,535,284 B2
(45) Date of Patent: Jan. 3, 2017

(54) LIQUID CRYSTAL DISPLAY DEVICE WITH MINIMIZED BEZEL

(71) Applicant: LG DISPLAY CO., LTD., Seoul (KR)

(72) Inventors: MiRa Kim, Daegu (KR); SeungHoon Yang, Daegu (KR)

(73) Assignee: LG DISPLAY CO., LTD., Seoul (KR)

(*) Notice: Subject to any disclaimer, the term of this patent is extended or adjusted under 35 U.S.C. 154(b) by 10 days.

(21) Appl. No.: 14/586,425

(22) Filed: Dec. 30, 2014

(65) Prior Publication Data
US 2015/0241625 A1    Aug. 27, 2015

(30) Foreign Application Priority Data

Feb. 27, 2014  (KR) .......................... 10-2014-0023596

(51) Int. Cl.
*G02F 1/1335* (2006.01)
*G02F 1/1333* (2006.01)
*F21V 8/00* (2006.01)

(52) U.S. Cl.
CPC ....... *G02F 1/133553* (2013.01); *G02B 6/0081* (2013.01); *G02B 6/0088* (2013.01); *G02F 1/133308* (2013.01); *G02F 1/133615* (2013.01); *G02B 6/0031* (2013.01); *G02F 2001/133314* (2013.01); *G02F 2001/133322* (2013.01); *G02F 2202/28* (2013.01)

(58) Field of Classification Search
CPC ................ G02F 2001/133317; G02F 1/33615; G02F 2001/133314; G02F 2202/28; G02F 1/133308; G02F 2001/133322; G02B 6/0081; G02B 6/0031; G02B 6/0088
See application file for complete search history.

(56) References Cited

U.S. PATENT DOCUMENTS

| | | | | |
|---|---|---|---|---|
| 7,463,227 B2* | 12/2008 | Van Gorkom | ....... | G02B 6/0033 345/30 |
| 2012/0287672 A1* | 11/2012 | Lee | ................... | G02F 1/133608 362/609 |
| 2015/0301266 A1* | 10/2015 | Araki | .................... | G02B 6/005 349/65 |

* cited by examiner

*Primary Examiner* — Nathanael R Briggs
(74) *Attorney, Agent, or Firm* — Birch, Stewart, Kolasch & Birch, LLP (57) ABSTRACT

A liquid crystal display device is provided which has a minimized bezel by a reduction in the size of a guide panel. The liquid crystal display device can include a liquid crystal display panel; a light source; a light guide plate for guiding light from the light source to the liquid crystal display panel; a reflective plate below the light guide plate to reflect the light from the light guide plate; a guide panel having an upper surface on which the liquid crystal display panel is disposed; a double-sided tape for fixing the reflective plate to the guide panel; a bottom cover for receiving the light guide plate and the guide panel; and a top cover for coupling the bottom cover and the guide panel, wherein a part of the double-sided tape is extended to the light guide plate to be in contact with the light guide plate.

9 Claims, 4 Drawing Sheets

LIQUID CRYSTAL DISPLAY DEVICE WITH MINIMIZED BEZEL

CROSS-REFERENCE TO RELATED APPLICATION

Pursuant to 35 U.S.C. §119(a), this application claims the benefit of earlier filing date and right of priority to Korean Application No. 10-2014-0023596, filed on Feb. 27, 2014, the contents of which is incorporated by reference herein in its entirety.

BACKGROUND OF THE INVENTION

Field of the Invention

The present invention relates to a liquid crystal display device, and more particularly, to a liquid crystal display device which ensures the holding power of a double-sided tape by minimizing the size of a guide panel and extending the double-sided tape to the bottom of a light guide plate.

Description of the Related Art

Recently, with the development of various portable electronic devices, such as mobile phones, personal digital assistances (PDA's), and laptop computers, the demand for a light-weight, thin, short and small flat panel display device that may be applied to various portable electronic devices has been increasing. As such, flat panel display devices, such as liquid crystal displays (LCDs), plasma display panels (PDPs), field emission displays (FEDs), vacuum fluorescent displays (VFDs), and the like have been actively studied. Among them, the LCDs have received much attention due to the possibility of mass production, the ease in driving such a device, its high picture quality, and the ability to produce a large-size screen.

The LCD is a transmissive display device that displays a desired image on a screen by adjusting the amount of light transmitting through a liquid crystal layer according to a refractive index anisotropy of liquid crystal molecules. Thus, the LCD includes a backlight, which is a light source that provides light transmitted through the liquid crystal layer to display an image. In general, the backlight is divided into two types: a side type backlight in which lamps or other light sources are installed at the side of a liquid crystal display panel and provide light to the liquid crystal layer; and a direct type backlight in which lamps or other light sources provide light directly from a lower portion of a liquid crystal display panel.

The side type backlight is installed at the side of the liquid crystal display panel to provide light to the liquid crystal layer via a reflective plate and a light guide plate. Thus, because the side type backlight can contribute to reduce the thickness, it is largely used for a laptop computer, etc. that requires a thin display device. However, the lamps for emitting light of the side type backlight are positioned at the side of the liquid crystal display panel, the side type backlight is not applicable to a large liquid crystal display panel and, in addition, because light is supplied through the light guide plate, high luminance cannot be obtained. Thus, the side type backlight is not suitable for a liquid crystal display panel in use for a large-scale LCD TV which has been recently drawing much attention.

As for the direct type backlight, because light emitted from the lamps is directly supplied to the liquid crystal layer, the direct type backlight is applicable to a large liquid crystal display panel. In addition, the direct type backlight has high luminance, it can be largely used in fabricating a liquid crystal display panel for an LCD TV.

Figure 1:
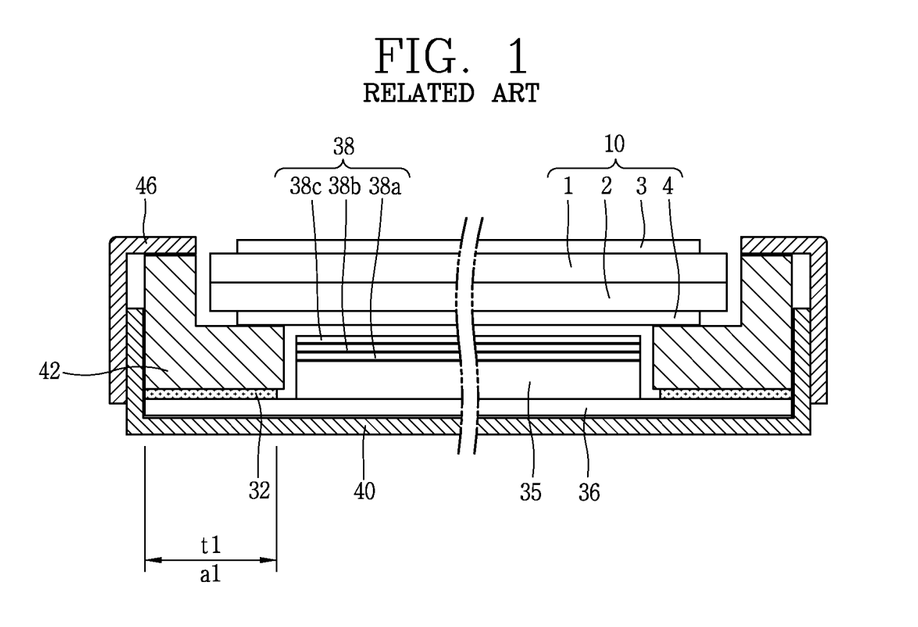
FIG. 1 is a cross-sectional view showing a structure of a liquid crystal display device according to a related art.

FIG. 1 is a view showing a liquid crystal display device with a backlight according to a related art.

As shown in FIG. 1, the liquid crystal display device according to the related art includes a liquid crystal display panel 10 including a first substrate 1, a second substrate 2, and a liquid crystal layer (not shown) interposed between the first and second substrates and implementing an image upon application of a signal from an external source; a light guide plate 35 disposed below the liquid crystal display panel 10 and guiding light emitted from a light source (not shown) to supply the light to the liquid crystal display panel 10; an optical sheet 38 provided between the liquid crystal display panel 10 and the light guide plate 35 and including a diffusion sheet 38a and prism sheets 38b and 38c for diffusing and condensing light guided by the light guide plate 35 to supply the light to the liquid crystal display panel 10; a reflective plate 36 disposed under the light guide plate 35 and reflecting the light guided down the light guide plate 35; a bottom cover 40 accommodating the reflective plate 36, the light guide plate 35, and the optical sheet 38; a guide panel 42 coupled with the bottom cover 40 to assemble the reflective plate 36, the light guide plate 35, and the optical sheet 38 and having the liquid crystal display panel 10 located on top of it; and a top cover 46 coupled with the guide panel 42 to assemble the liquid crystal display panel 10.

The first substrate 1 of the liquid crystal display panel 10 is a thin film transistor array substrate where thin film transistors are formed. Various lines and pixel electrodes, as well as the thin film transistors, are formed on the first substrate 1. The second substrate 2 is a color filter substrate where color filter layers and a black matrix are formed. A first polarizer 3 and a second polarizer 4 are respectively attached to the first and second substrates 1 and 2 of the liquid crystal display panel 10 to change the polarization state of light coming into and going out of the liquid crystal display panel 10 and implement an image.

When assembling the liquid crystal display panel 10, the top cover 46 and the guide panel 42 are coupled by a coupling unit such as screws, the guide panel 42 is attached to the reflective plate 36 disposed under a double-sided tape 32, and the liquid crystal display panel 10 is held and assembled by the guide panel 46.

However, the liquid crystal display device having such a structure has the following problems.

In recent years, much attention has been being given to liquid crystal display devices with attractive appearance which become smaller in size and as lightweight as possible by minimizing the bezel area. To fabricate a liquid crystal display device with a minimized bezel, it is necessary to make the outer edge region of the liquid crystal display device occupied by the guide panel 46 by minimizing the size of the guide panel, which is disposed on the outer edge of the liquid crystal display device, holds the liquid crystal display panel 10, and is coupled with the bottom cover and the top cover.

By the way, the width of the double-sided tape 32, adhering to the guide panel 46 to attach and fix the guide panel 46 and the reflective plate 36, should be reduced when minimizing the size of the guide panel 46. However, the size of the guide panel 34, to which the double-sided tape adheres, that is, which is formed along the outer periphery of the liquid crystal display panel 10, also increases as the liquid crystal display device becomes larger and the size of the liquid crystal display panel increases. Hence, the length of the double-sided tape 32 adhering to the guide panel 46 in a strip shape increases. On the other hand, as the width of the double-sided tape 32 decreases, the double-sided tape 32 should be cut lengthwise into narrow strips. As a result, the cutting precision is lowered.

That is to say, it takes a long processing time to form narrow strips of double-sided tape 32, and high-precision processing equipment is required, thus raising the manufacturing costs.

SUMMARY OF THE INVENTION

An aspect of the present invention is to provide a liquid crystal display device which prevents wrinkles on a double-sided tape caused by the thermal expansion of a light guide plate and a guide panel by minimizing the area of the guide panel and eliminating the adhesion between the double-sided tape and the light guide plate when the double-sided tape is extended to the bottom of the light guide plate.

In order to accomplish this aspect of the present invention, there is provided according to an embodiment a liquid crystal display device comprising: a liquid crystal display panel; a light source; a light guide plate for guiding light from the light source to the liquid crystal display panel; a reflective plate below the light guide plate to reflect the light from the light guide plate; a guide panel having an upper surface on which the liquid crystal display panel is disposed; a double-sided tape for fixing the reflective plate to the guide panel; a bottom cover for receiving the light guide plate and the guide panel; and a top cover for coupling the bottom cover and the guide panel, wherein a part of the double-sided tape is extended to the light guide plate to be in contact with the light guide plate, and the adhesion of the contacting area between the light guide plate and the double-sided tape is eliminated.

An anti-adhesive film having a low surface energy can be formed on the entire lower surface of the light guide plate or in an area of contact between the lower surface of the light guide plate and the double-sided tape, and the anti-adhesive film can be made of a fluorine substance.

The double-sided tape can include a base film; a first adhesive layer applied to the lower surface of the base film; a second adhesive layer formed in one area on the upper surface of the base film and adhering to the lower surface of the guide panel; and a dummy layer formed in another area on the upper surface of the base film and coming into contact with the lower surface of the light guide plate, or the double-sided tape comprises: a base film; a first adhesive layer formed on the lower surface of the base film; a second adhesive layer formed on the upper surface of the base film; and an anti-adhesive layer formed on the upper surface of the second adhesive layer and coming into contact with the lower surface of the light guide plate.

According to an example of the present invention, elimination of the adhesion between the light guide plate and the double-sided tape can minimize the area of the guide panel and make the double-sided tape the same width as the related art, so that the light guide plate and the double-sided tape are kept from being attached to each other even if the double-sided tape partially comes into contact with the lower surface of the light guide plate. Thus, even with an increase in the volume of the light guide plate due to thermal expansion or the like, no holding power is applied to the reflective plate below the light guide plate, thereby preventing defects such as wrinkles on the reflective plate.

In this way, the double-sided tape has the same width as the related art even if the width of the guide panel is minimized. Thus, the double-sided tape can be processed with ease, and the same related art double-sided tape processing equipment can be used as is conventionally done, thereby cutting down the manufacturing costs and reducing the manufacturing time.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A-5C are views showing a structure of a double-sided tape according to another exemplary embodiment of the present invention, wherein

DETAILED DESCRIPTION OF THE INVENTION

Hereinafter, embodiments of the present invention will be described in detail with reference to the accompanying drawings.

One of the best ways to fabricate a liquid crystal display device having a minimized bezel and featuring an attractive appearance is to reduce the size of a guide panel. In this instance, the width of a double-sided tape for attaching the guide panel and a reflective plate should be reduced because the area of attachment of the reflective plate to the guide panel is reduced. In one or more embodiments of the present invention, however, the width of the double-sided tape is preferably the same as the related art, and the double-sided tape partially overlaps the light guide plate.

Particularly, the formation of wrinkles on the double-sided tape is prevented by eliminating the adhesion of the overlapping region between the light guide plate and the double-sided tape.

Figure 2:
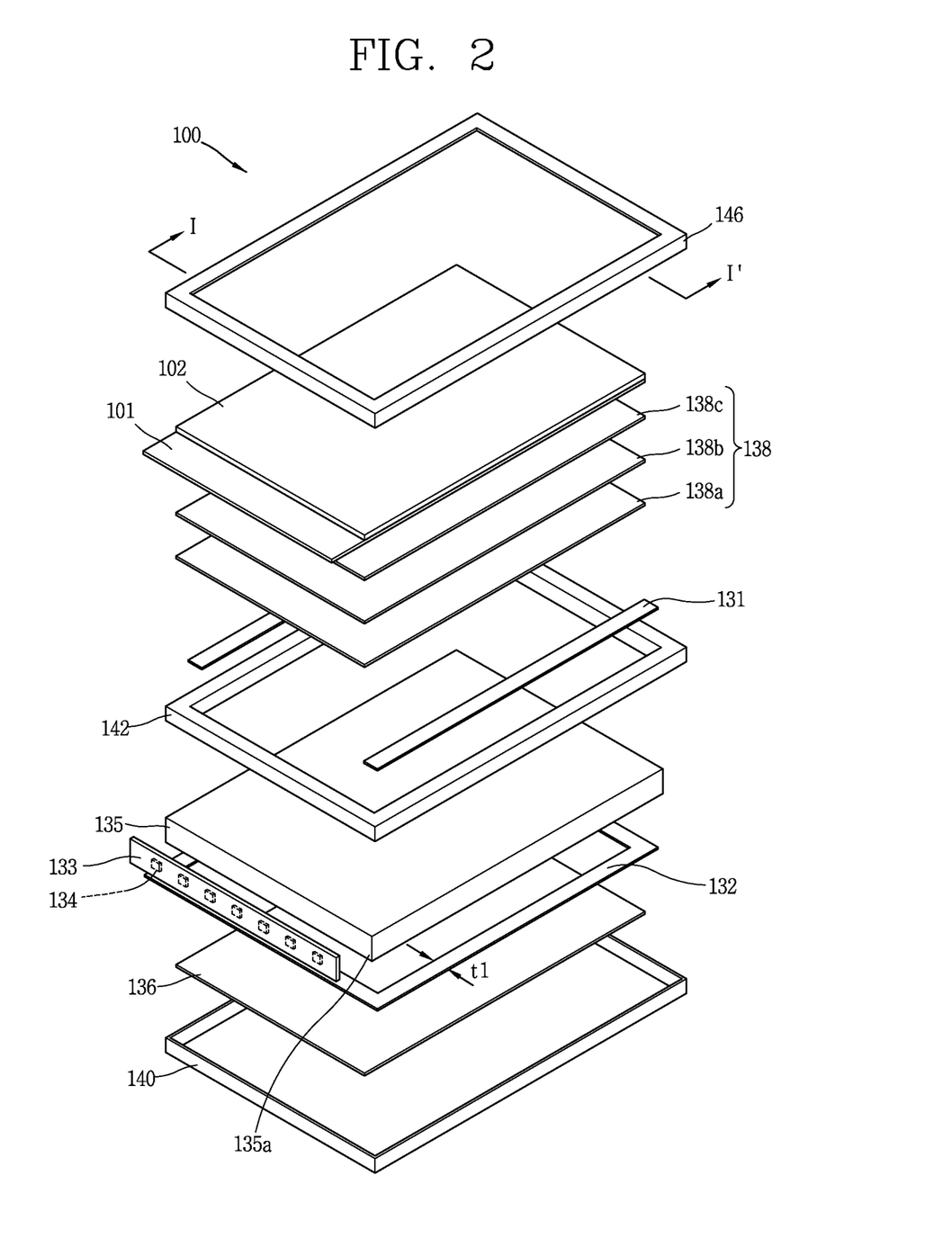
FIG. 2 is an exploded perspective view of a liquid crystal display device according to an exemplary embodiment of the present invention.

FIG. 2 is an exploded perspective view of a liquid crystal display device according to an exemplary embodiment of the present invention.

As illustrated in FIG. 2, the liquid crystal display device according to the exemplary embodiment of the present invention includes a liquid crystal display panel 110 and a backlight. The liquid crystal display panel 110 includes a first substrate 101, a second substrate 103, and a liquid crystal layer (not shown) interposed between the two substrates, and implements an image upon application of a signal from an external source.

The backlight includes a plurality of LEDs (light emitting diodes) 134 mounted on an LED substrate 133 and emitting light, a light guide plate 135 disposed below the liquid crystal display panel 110 and guiding light emitted from the LEDs 134 to supply the light to the liquid crystal display panel 110, an optical sheet 138 provided between the liquid crystal display panel 110 and the light guide plate 135 and including a diffusion sheet 138a and prism sheets 138b and

138c for diffusing and condensing light guided by the light guide plate 135 to supply the light to the liquid crystal display panel 110, and a reflective plate 136 disposed below the light guide plate 135 and reflecting the light guided down the light guide plate 135.

Although, in the drawing, the LED substrate 133 and the LEDs 134 are disposed on only one side of the light guide plate 135, they may be disposed on both sides of the light guide plate 135.

Moreover, while the LEDs 134 are disclosed as a light source in the present invention, any other light source such as fluorescent lamps such as CCFL (cold cathode fluorescent lamps) or EEFL (external electrode fluorescent lamps) may be used instead of the LEDs 134. When the fluorescent lamps are used as the light source, a lamp housing with fluorescent lamps in it, rather than the LED substrate 133, is disposed on the side of the light guide plate 135.

The reflective plate 136, light guide plate 135, and optical sheet 138 of the backlight are accommodated in a bottom cover 140 and then assembled as the bottom cover 140 and the guide panel 142 are coupled together.

The liquid crystal display panel 110 is placed on top of the guide panel 142. As the guide panel 142 has a rectangular shape, the edge region of the liquid crystal display panel 110 is placed on the guide panel 142.

A pad 131 is attached to the upper surface of the guide panel 142, and the liquid crystal display panel 110 is placed on the pad 131. As the pad 131 is made of an elastic material such as resin, the pad 131 absorbs external shock applied when the liquid crystal display panel 110 is fixed, thereby preventing damage to the liquid crystal display panel 110. The pad 131 has a given width and the same length as one side of the guide panel 142, and disposed along either side of the upper surface of the guide panel 142. An adhesive material is applied to the upper and lower surfaces of the pad 131 to fix the liquid crystal display panel 110 to the guide panel 142, preventing the liquid crystal display panel 110 from moving due to external force.

Although the pad 131 is disposed only on either side of the upper surface of the guide panel 142, it may be disposed on four sides of the upper surface of the guide panel 142.

The light guide plate 135 is for guiding light entering through the side from the LEDs 134 to the liquid crystal display panel 110. Light incident either on one side or two sides of the light guide plate 135 is reflected within the light guide plate 135 and propagated to the other side, and then supplied to the liquid crystal display panel 110 through the upper surface of the light guide plate 135.

The double-sided tape 132 is disposed between the reflective plate 136 and the guide panel 142 to attach the reflective plate 136 to the lower surface of the lower surface of the guide panel 142. The double-sided tape 132, in the shape of a rectangular strip with a given width, is disposed along the outer periphery of the guide panel 142.

The width of the guide panel 142 is smaller than that of the related art, and the width of the double-sided tape 132 can be the same as that of the related art. Hence, when the double-sided tape 132 is attached to the lower surface of the guide panel 142, part of the double-sided tape 132 is extended to the bottom of the guide panel 142 and positioned on the lower surface of the light guide plate 135.

The optical sheet 138 supplies light coming from the light guide plate 135 after improving the efficiency of the light. The optical sheet 138 includes a diffusion sheet 138a for diffusing the light coming from the light guide plate 138 and two prism sheets 138b and 138c for condensing the light diffused by the diffusion sheet 138a to supply uniform light to the liquid crystal display panel 110. The two prism sheets improve the straightness of light as prisms along the x and y axes intersect at a right angle and refract light along the x and y axes.

A top cover 146 is placed on the upper edge region of the liquid crystal display panel 110. As the top cover 146 is coupled with the bottom cover 140 and the guide panel 142, the liquid crystal display panel 110 and the backlight are assembled to complete the liquid crystal display device.

Although not shown, a plurality of gate lines and data lines are arranged vertically and horizontally to define a plurality of pixel regions on the first substrate 101. A thin film transistor (TFT), i.e., a switching element, is formed in each pixel region, and a pixel electrode is formed on each pixel region. The TFT includes a gate electrode connected to a gate line, a semiconductor layer formed by stacking amorphous silicon or the like on the gate electrode, and source and drain electrodes formed on the semiconductor layer and connected to a data line and the pixel electrode.

The second substrate 102 includes color filters including a plurality of sub-color filters implementing red (R), green (G), and blue (B) colors, and a black matrix demarcating the sub-color filters and blocking light transmitted through the liquid crystal layer.

The first and second substrates 101 and 102 are attached together in a facing manner by a sealant formed on the outer edge of an image display area to form the liquid crystal display panel. In this case, the attachment of the first and second substrates 101 and 102 can be done by an attachment key formed on the first substrate 101 or the second substrate 102. As the first substrate 101 has a larger area than the second substrate 120, a pad region extending from the second substrate 102 is formed in a certain area of the first substrate 101, and one end of a flexible substrate 132 is attached to this area.

The liquid crystal display device having the above configuration according to an embodiment of the present invention will be described in more detail with reference to FIG. 3.

Figure 3:
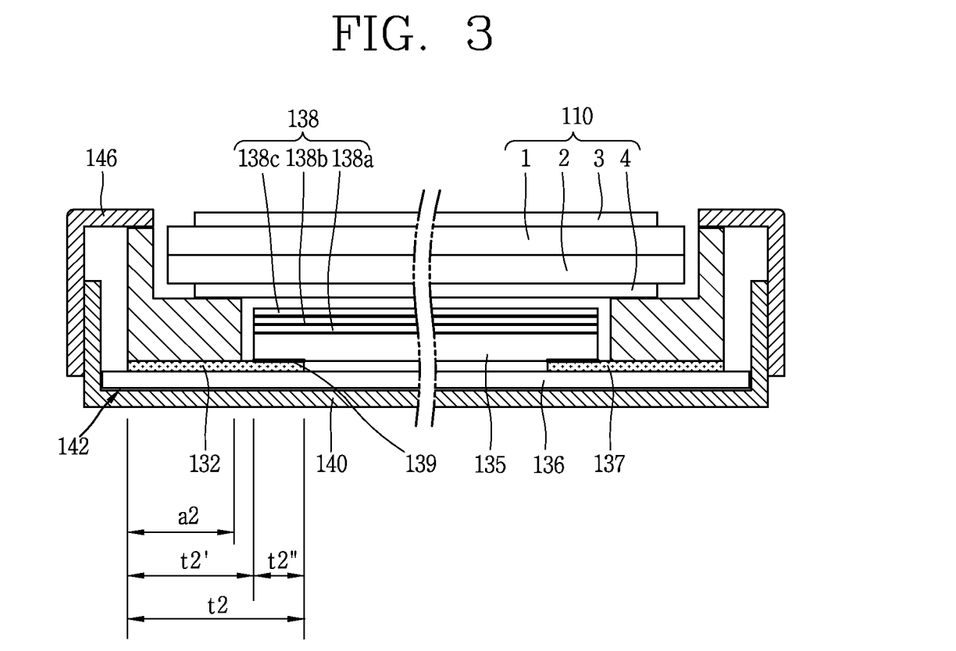
FIG. 3 is a cross-sectional view taken along the line I-I' of FIG. 2.

As illustrated in FIG. 3, a pad 131 is formed on the guide panel 142, and the liquid crystal display panel 110 is placed above the pad 131. As the guide panel 142 is coupled with the bottom cover 140 and the top cover 146, the liquid crystal display device is assembled. A region extending to the light guide plate 135 is formed on the bottom cover 142, and the liquid crystal display panel 110 is placed on the upper surface of the extension region.

As illustrated in the figure(s), a first polarizer 103 and a second polarizer 104 are respectively attached to the first substrate 101 and the second substrate 102. Thus, when the liquid crystal display panel 110 is held by the guide panel 142, the first polarizer 103 is brought into contact with the pad 131.

Although the guide panel 142 is made of a plastic material, it may be made of other materials such as SUS. The guide panel 142 has a given width and thickness and has a rectangular shape along the edge of the liquid crystal display panel 110, and the liquid crystal display panel 110 is fixed at a certain height from the upper surface of the guide panel 142. In this instance, the width of the guide panel 142 is greatly reduced compared to the related art. As the width a2 of the guide panel 142 of the liquid crystal display device according to the present invention is smaller than the width a1 of the guide panel of the related art liquid crystal display device of FIG. 1 (a1>a2), the bezel area outside the display area where an image is actually implemented can be minimized compared to the related art liquid crystal display device.

The light guide plate 135 is for guiding light coming from the LEDs 134 to the liquid crystal display panel 110 through one side or both sides, and generally made of a material, such as PMMA (polymethylmethacrylate) that has high light transmittance in the visible light range and good mechanical characteristics and chemical resistance. The light guide plate 135 is in the shape of a rectangle, and though not shown, a pattern or groove may be formed in a given shape on the lower surface of the light guide plate 135 to reflect light reflected and incident from the upper surface back to the upper surface.

The pattern may be in a circular, triangular, or polygonal shape, and the groove also may be made in various shapes including a concave hemisphere or concave ellipse. Moreover, the configuration and density of the pattern or groove may vary as required. In other words, the shape, size, etc of the pattern or groove can be designed considering various factors like the driving mode of the liquid crystal display panel, the width of the liquid crystal display panel, the material of the light guide plate 135, the thickness of the light guide plate 135, and the type of light source that irradiates the light guide plate 135 with light.

The double-sided tape 132 is disposed above the reflective plate 140. The double-sided tape 132 is made into the shape of a strip with a given width t2, and disposed in rectangular form along the outer periphery of the reflective plate 140. The width t2 of the double-sided tape 132 of the liquid crystal display device according to the present invention is equal to the width t1 of the double-sided tape of the related art liquid crystal display device of FIG. 1 (t1=t2).

In this way, according to an embodiment of the present invention, the width of the guide panel 142 is smaller compared to the related art liquid crystal display device, and the width of the double-sided tape 132 is the same as the related art. Accordingly, a part with a given width t2' of the double-sided tape 132 is attached to the lower surface of the guide panel 142, and the remaining part with a given width t2" of the double-sided tape 132 comes into contact with the lower surface of the light guide plate 135.

An anti-adhesive film 139 made of a fluororine substance. The anti-adhesive film 139 is for eliminating the adhesion between the double-sided tape and the lower surface of the light guide plate 135 when the double-sided tape 132 comes into contact with the lower surface of the light guide plate 135. The reason why the adhesion between the double-sided tape 132 and the light guide plate 135 will be described below.

In general, the guide panel 142 is made of a plastic material and the light guide panel 135 is made of PMMA, which means that they have different physical properties. When the liquid crystal display device is used under various conditions, for example, at various temperatures, the guide panel 142 and the light guide plate 135 have different degrees of thermal expansion. When the double-sided tape 132 is attached to the lower surface of the guide panel 142 and the lower surface of the light guide plate 135, the difference in thermal expansion between the guide panel 142 and the light guide panel 135 cause a difference between the holding power of the double-sided tape 132 applied to the reflective plate 140 attached to the guide panel 142 versus the light guide plate 135.

Such a difference in holding power can occur with the use of a typical liquid crystal display device, and get more pronounced with severe temperature variations during an environmental test.

The difference in holding power are caused not only by the difference in thermal expansion between the guide panel 142 and the light guide plate 135 but by differences in many physical properties such as surface energy. The difference in holding power can cause wrinkles on the reflective plate 140, and these wrinkles can deteriorate the attachment of the reflective plate 140 and also can bring about a change in the direction of light incident from the light guide plate 135 and reflected on the reflective plate 140. As a consequence, a defect occurs when attaching the guide panel 142 and the reflective plate 140 together. This generates an assembly defect in the liquid crystal display device, and leads to the problem of non-uniform luminance due to irregular reflection of light on the reflective plate.

To solve these problems, according to an embodiment of the present invention, the anti-adhesive film 139 made of a fluorine substance is applied to the lower surface of the light guide plate 135. Fluorine is known to have the lowest surface energy, out of all the elements available on earth. Accordingly, once the anti-adhesive film 139 made of a fluorine substance is formed on the lower surface of the light guide plate 135, the double-sided tape 132 is not attached to the lower surface of the light guide plate 135 due to the fluorine substance having the low surface energy, even if the lower surface of the light guide plate 135 comes into contact with the double-sided tape 132.

Therefore, the double-sided tape 132, if disposed on the lower surfaces of the guide panel 142 and light guide plate 135, is attached to the lower surface of the guide panel 142 with constant adhesive strength, but is not attached to the lower surface of the light guide plate 135 and instead only comes into contact with it. If the guide panel 142 and the light guide plate 135 are thermally expanded due to a temperature change or the like, the double-sided tape 132 is attached only to the guide panel 142 but not to the light guide plate 135 because the guide panel 142 and the light guide plate 135 have different degrees of thermal expansion. Thus, holding power caused by thermal expansion is not applied to the reflective plate 140 below the light guide plate 135, and the light guide plate 135 slides when thermally expanded.

This causes a difference in the holding power applied to the reflective plate 140 attached to the guide panel 142 versus the light guide panel 135. As a consequence, no wrinkles are formed on the reflective plate 140, thus preventing an assembly defect and a luminance defect.

As seen from above, the anti-adhesive film 139 made of a fluorine substance is formed on the lower surface of the light guide plate 135 to eliminate the adhesion between the light guide plate 135 and the double-sided tape. This can minimize the area of the guide panel 142 and make the double-sided tape 132 the same width as the related art, so that the light guide plate 135 and the double-sided tape 132 are kept from being attached to each other even if the double-sided tape 132 partially comes into contact with the lower surface of the light guide plate 135. Thus, even with an increase in the volume of the light guide plate 135 due to thermal expansion or the like, no holding power is applied to the reflective plate 140 below the light guide plate 135, thereby preventing defects such as wrinkles on the reflective plate 140.

In this way, the double-sided tape 132 has the same width as the related art even if the width of the guide panel 142 is minimized. Thus, the double-sided tape 132 can be processed with ease, and the same related art double-sided tape processing equipment can be used as is conventionally done, thereby cutting down the manufacturing costs and reducing the manufacturing time.

The anti-adhesive film 139 is made of, but not limited to, a fluorine substance, and can be made of any material as long as it has a low surface energy.

Although the anti-adhesive film 139 may be formed on the entire lower surface of the light guide plate 135, a desired result can be obtained as long as the anti-adhesive film 139 is formed in an area contacting the double-sided tape, because the substantial role of the anti-adhesive film 139 is to prevent the adhesion between the light guide plate 135 and the double-sided tape 132.

Figure 4:
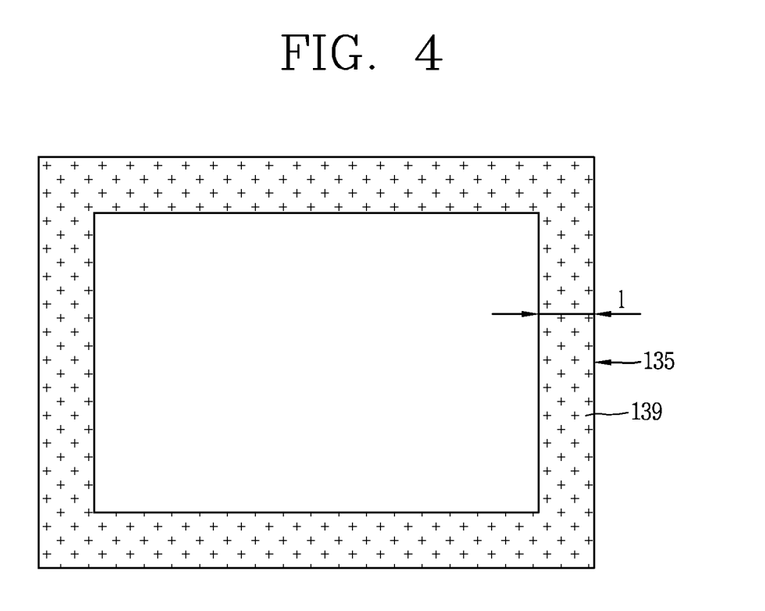
FIG. 4 is a view showing the lower surface of a light guide plate according to the exemplary embodiment of the present invention.

FIG. 4 illustrates the anti-adhesive film 139 formed on the lower surface of the light guide plate 135. As illustrated in FIG. 4, the anti-adhesive film 139 has a given width I along the outer periphery of the lower surface of the light guide plate 135. As the area of contact between the double-sided tape 132 and the lower surface of the light guide plate 135 has the width t2", the width I of the anti-adhesive film 139 is preferably equal to or slightly greater than the width t2" of the area of contact between the double-sided tape 132 and the light guide plate 135 (t2"≤I). This is because the light guide plate 135 expands due to thermal expansion or an assembly tolerance can occur during assembling of the liquid crystal display device. For this reason, the width of the anti-adhesive film 139 is determined considering the degree of thermal expansion and assembly tolerance of the material constituting the light guide plate 135.

While, in the foregoing description, the adhesion between the light guide plate 135 and the double-sided tape 132 is eliminated by processing some part of or the entire lower surface of the light guide plate 135 (for example, applying a material with a low surface energy), the adhesion of an area contacting the lower surface of the light guide plate 135 may be eliminated by processing the double-sided tape 132. This will be described in detail below.

Figure 5A:
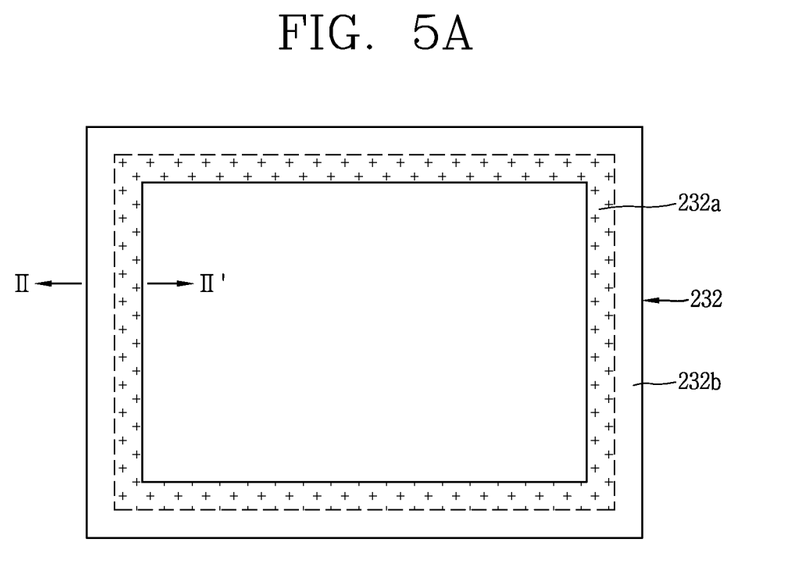
FIG. 5A is a top plan view of the double-sided tape.
Figure 5B:
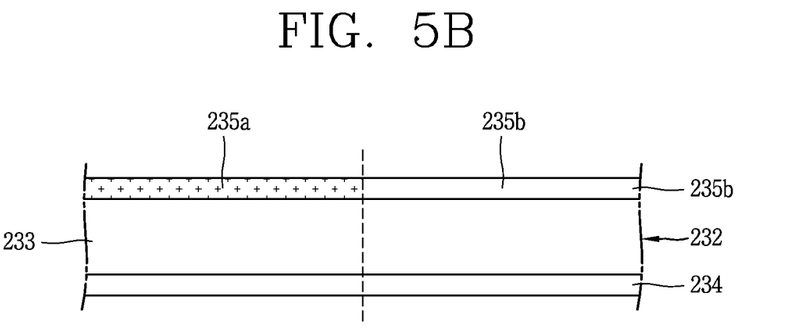
FIGS. 5B and 5C are cross-sectional views taken along the line II-II' of FIG. 5A.
Figure 5C:
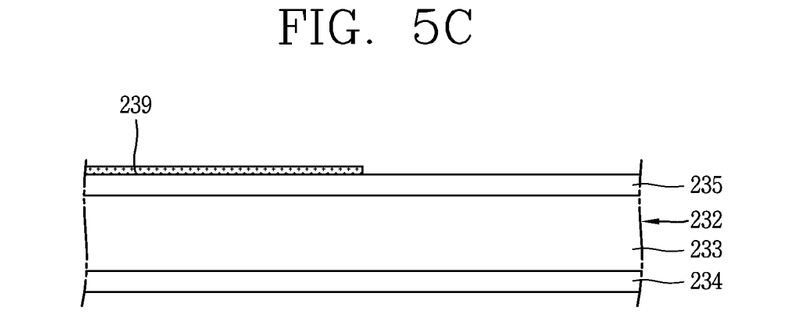

FIGS. 5A to 5C are views showing a double-sided tape of a liquid crystal display device according to another exemplary embodiment of the present invention.

As illustrated in FIG. 5A, a double-sided tape 232 is in the shape of a rectangular strip with a given width. The double-sided tape 232 includes a first area 232a and a second area 232b. The first area 232a is an area contacting the lower surface of a light guide plate when the double-sided tape 232 is attached to a reflective plate, and the second area 232b is an area contacting the lower surface of a guide panel. The width of the double-sided tape 232 is the same as the double-sided tape of a related art liquid crystal display device.

As illustrated in FIG. 5B, the double-sided tape 232 includes a base film 233, a first adhesive layer 234 applied to the lower surface of the base film 232, a second adhesive layer 235b formed in the second area on the upper surface of the base film 232, and a dummy layer 235a formed in the first area on the upper surface of the base film 232 and having do adhesive force.

The base film 233 is generally made of PET (polyethylene terephthalate resin), but may be made of other materials. Although not shown in the drawings, the base film 233 may be in white and any one of highly reflective materials including silver Ag, aluminum Al, and copper Cu may be applied to the base film 233.

The first adhesive layer 234 and the second adhesive layer 235b are made of adhesive resin, and the dummy layer 235a is made of a non-adhesive organic insulating material, such as resin. The first adhesive layer 234 adheres to the upper surface of the reflective plate, and the second adhesive layer 235b adheres to the lower surface of the guide panel. The dummy layer 235a comes into contact with the lower surface of the light guide plate. If the second adhesive layer 235b and the dummy layer 235a are made with the same thickness and the double-sided tape 232 is disposed below the light guide plate and the guide panel, any assembly defect caused by a thickness difference between the second adhesive layer 235b and the dummy layer 235a can be avoided.

With this structure of the double-sided tape 232, the first adhesive layer 234 and the second adhesive layer 235b adhere to the reflective plate and the guide panel, respectively, to attach the reflective plate to the guide panel. On the other hand, the dummy layer 235a does not adhere to the lower surface of the light guide plate but only comes into contact with it. Thus, if the reflective plate is fixed with the double-sided tape 232, no holding power is applied between the light guide plate and the reflective plate attached together by the double-sided tape 232, even if the guide panel and the light guide plate are thermally expanded due to a temperature rise. This prevents wrinkles on the reflective plate caused by a difference in holding power.

FIG. 5c is a view showing another structure of the double-sided tape 232. As illustrated in FIG. 5C, the double-sided tape 232 includes a base film 233, a first adhesive layer 234 and a second adhesive layer 235 respectively formed on the lower and upper surfaces of the base film 232, and an anti-adhesive film 239 formed in a first area (i.e., area disposed on the lower surface of the light guide plate) on the upper surface of the second adhesive layer 235.

The anti-adhesive film 239 is made of a material having a low surface energy, for example, a fluorine substance. When the double-sided tape 232 is located on the lower surface of the guide panel and the upper surface of the reflective plate to attach the guide panel and the reflective plate together, the anti-adhesive film 239 is located on the lower surface of the light guide plate. Since the anti-adhesive film 239 has a low surface energy, it prevents the second adhesive layer 235 of the double-sided tape 232 from adhering to the lower surface of the light guide plate. Thus, if the reflective plate is fixed with the double-sided tape 232, no holding power is applied between the light guide plate and the reflective plate, even if the guide panel and the light guide plate are thermally expanded due to a temperature rise. This prevents wrinkles on the reflective plate caused by a difference in holding power.

While the foregoing detailed description discloses a liquid crystal display device having a particular structure, the present invention is not limited to this particular structure. One or more embodiments of the present invention have been devised to use a double-sided tape with the same width as the related art even when the area of the guide panel is reduced, and one of the features of this invention is to eliminate the adhesion between the lower surface of the light guide plate and the double-sided tape, in order to prevent wrinkles on the double-sided tape even if the double-sided tape partially comes into contact with the lower surface of the light guide plate due to the reduction in the area of the guide panel.

Accordingly, as long as the adhesion between the lower surface of the light guide plate and the double-sided tape can be eliminated, currently available liquid crystal display panels or backlights of any structure may be applicable.

The embodiments of the invention being thus described, it will be obvious that the same may be varied in many ways.

Such variations are not to be regarded as a departure from the spirit and scope of the invention, and all such modifications as would be obvious to one skilled in the art are intended to be included within the scope of the following claims.

What is claimed is:

1. A liquid crystal display device comprising:
    a liquid crystal display panel;
    a light source;
    a light guide plate for guiding light from the light source to the liquid crystal display panel;
    a reflective plate below the light guide plate to reflect the light from the light guide plate;
    a guide panel having an upper surface on which the liquid crystal display panel is disposed;
    a double-sided tape for fixing the reflective plate to the guide panel, a top side of the double-sided tape being directly coupled to a bottom surface of the light guide plate, a bottom side of the double-sided tape being directly coupled to a top surface of the reflective plate;
    a bottom cover for receiving the light guide plate and, the guide panel; and
    a top cover for coupling the bottom cover and the guide panel,
    wherein a part of the double-sided tape is extended to the light guide plate to be in contact with the light guide plate, and the adhesion of the contacting area between the light guide plate and the double-sided tape is eliminated, and
    wherein an outside edge of the double-sided tape is substantially aligned horizontally with an outside edge of the guide panel.

2. The liquid crystal display device of claim 1, wherein the light source includes at least one light emitting diode (LED) or fluorescent lamp on a side of the light guide plate.

3. The liquid crystal display device of claim 1, further comprising:
    an anti-adhesive film having a low surface energy and disposed on an entire lower surface of the light guide plate.

4. The liquid crystal display device of claim 3, wherein the anti-adhesive film is made of a fluorine substance.

5. The liquid crystal display device of claim 1, further comprising:
    an anti-adhesive film having a low surface energy and disposed in an area of contact between a lower surface of the light guide plate and the double-sided tape.

6. The liquid crystal display device of claim 5, wherein the anti-adhesive film is made of a fluorine substance.

7. The liquid crystal display device of claim 1, wherein the double-sided tape comprises:
    a base film;
    a first adhesive layer on a lower surface of the base film;
    a second adhesive layer in one area on an upper surface of the base film, the second adhesive layer being adhered to a lower surface of the guide panel; and
    a dummy layer formed in another area on the upper surface of the base film, the dummy layer being in contact with a lower surface of the light guide plate.

8. The liquid crystal display device of claim 1, wherein the double-sided tape comprises:
    a base film;
    a first adhesive layer on a lower surface of the base film;
    a second adhesive layer on an upper surface of the base film; and
    an anti-adhesive layer on an upper surface of the second adhesive layer, the anti-adhesive layer being in contact with a lower surface of the light guide plate.

9. The liquid crystal display device of claim 1, further comprising:
    an anti-adhesive substance on a first surface of the double-sided tape facing the light guide plate without being on a second surface of the double-sided tape.

* * * * *